Oct. 4, 1960 W. R. AIKEN 2,955,231

ELECTRONIC SELECTOR DEVICE

Filed Oct. 1, 1957 4 Sheets-Sheet 1

INVENTOR.
William R. Aiken,
BY Brown, Jackson, Boettcher & Dienner
Att'ys.

INVENTOR.
William R. Aiken,
BY Brown Jackson Boettcher & Dienner
Attys.

Oct. 4, 1960 W. R. AIKEN 2,955,231

ELECTRONIC SELECTOR DEVICE

Filed Oct. 1, 1957 4 Sheets-Sheet 3

INVENTOR.
William R. Aiken
BY Brown, Jackson, Boettcher & Dienner
Att'ys.

Oct. 4, 1960 W. R. AIKEN 2,955,231

ELECTRONIC SELECTOR DEVICE

Filed Oct. 1, 1957 4 Sheets-Sheet 4

INVENTOR.
William R. Aiken
BY [signature]
Att'ys.

United States Patent Office 2,955,231

Patented Oct. 4, 1960

2,955,231

ELECTRONIC SELECTOR DEVICE

William Ross Aiken, Los Altos, Calif., assignor, by mesne assignments, to Kaiser Industries Corporation, a corporation of Nevada Filed Oct. 1, 1957, Ser. No. 687,486

20 Claims. (Cl. 315—169)

The present invention is directed to a novel control system for selectively exciting the different points on a display device, and particularly to a control system which is adapted for use in effecting the selective excitation of such points on display devices of the so-called electroluminescent, gaseous and vacuum types.

The use of display devices to accurately present a visual display of discrete sets of information on an associated screen or target has long been known in the military, industrial, and commercial fields. The nature of the devices and their application are extremely varied, one of the more better known applications of such type device comprising the use of the well known cathode-ray tube display device in television sets to present televised displays in the home for entertainment and educational purposes. Such type display device is also used extensively in the radar units of ships and aircraft to provide a visual indication of the proximity of other objects and thereby provide a more safe operating condition. In industry, display devices are used extensively in all phases of research, development, control and maintenance; and in the military, such equipment is basic to the planning and execution of most military operations. The many specific applications of the display devices in these and other environments are too numerous to set forth herein.

The very nature of the diversity of the application of the display devices has resulted in a constant search for a device which is of a more simple construction, of a reduced weight and size, and of sufficient reliability to permit the use thereof in the rugged environments which are normally experienced in its use in the different industrial and military applications.

As a result of such search, the art has developed, among others, the solid state, the gaseous, and the vacuum types of display units. In the so-called solid state display devices, a layer of phosphor is sandwiched between a pair of conducting plates, and electronic fields are applied to the plates to cause the phosphor to act as transducers in the transformation of electrical energy to light energy. In one known embodiment, an array of horizontal and vertical conductors are positioned on each side of the phosphor layer, the different intersecting points of the different horizontal and vertical conductors providing a plurality of points at which energization of the phosphor may occur. That is, by applying energizing signals to a horizontal conductor and a vertical conductor to establish an electric potential difference therebetween, the phosphor which is located at the intersecting point of the conductors thus energized is caused to luminesce. Ostensibly, the different horizontal and vertical conductors can be selectively energized to effect excitation of the different points in any desired sequence and combination, and thereby the desired visual display.

In the gaseous type display devices, a plurality of individual gas tubes are arranged in successive horizontal and vertical columns, and the desired display is effected by selectively energizing the pertinent ones of the tubes. In a modified embodiment of the gaseous tube display device, a plurality of horizontal conductors are disposed in spaced relation with a plurality of vertically disposed conductors in a gas filled envelope, and the horizontal and vertical conductors at their spaced crossover points form a plurality of anode and cathode elements. Such arrangement in effect duplicates the pattern provided by a plurality of individual gas diode tubes. Selective application of the proper potentials to the different vertical and horizontal conductors effects energization of the anodes and cathodes located at the corresponding crossover points and breakdown of the gas at such points. These and other variations of the solid state, gaseous and vacuum type tubes known heretofore in the art employ the same basic concept of selectively energizing the different points of crossover of a plurality of horizontal and vertical conductors to provide a visual display.

In each of these prior art attempts there has been, and is, the constant problem of providing suitable switching equipment for effecting selective energization of the different conductors in the desired combinations necessary to reproduce the desired information thereon, and it is the primary object of the present invention to provide a novel switching system which is readily adapted to selectively energize the different conductors of such type devices for purposes of display. Another primary object of the invention is the provision of solid state, a gaseous, and a vacuum type display device which include and are operative with the novel switching device.

The foregoing objects and other advantages and features of the invention will become apparent with consideration of the following description and drawings which disclose various embodiments of the invention, and in which Figure 1 is a perspective view, which is partly fragmented along one edge, of an electroluminescent cell adapted for use with the novel scanning arrangement of the disclosure;

*General description*

Figures 1, 2, 3, 4:
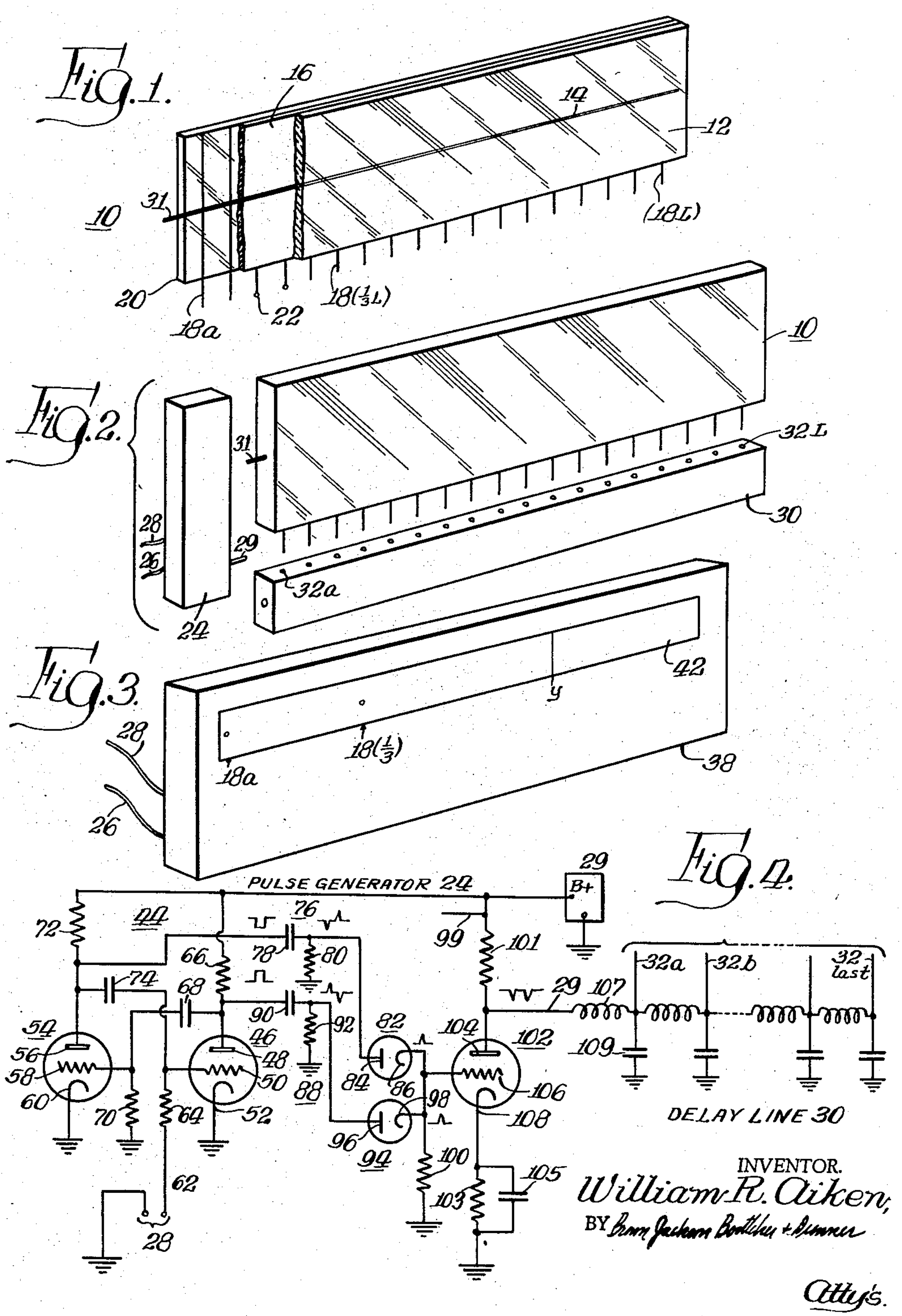
Figure 2 is a perspective view of the display device of Figure 1 and the scanning components for use therewith.
Figure 3 is an assembled view of the components shown in Figure 2.
Figure 4 illustrates details of the circuitry of the components shown in Figure 2.

The novel electronic selection arrangement is adapted for use with the solid state, gaseous and vacuum type display devices. In the interest of a brief disclosure however the description has been primarily directed to a teaching of the use thereof in the operation of a solid state device. The manner of its use with other types of devices will be apparent therefrom.

One new and novel solid state arrangement in which an improved display is effected with a novel switching arrangement was disclosed in the copending applications which were filed by W. R. Aiken on August 15, 1955, November 4, 1955, and March 27, 1956, and received Serial Nos. 528,222, 544,919 and 617,878, respectively, and the present invention is considered to be a continuation-in-part of such applications.

Briefly, such applications are directed to a solid state device which basically include a pair of conductor plates having a phosphor layer therebetween, and radiator means operative to establish standing or coincident waves along the conductor plates. The difference of potential at the point (or series of points) along the plates at which the standing wave occurs is of a magnitude sufficient to excite the phosphor, and thereby cause same to luminesce along a line which is perpendicular to the direction of wave transmission. In one embodiment of such concept, a second radiator means effects the establishment of standing waves along a second axis which is perpendicular to the axis of propagation of the first set of standing waves, the value of the potentials at the point of intersection of the two wave sets being of a value sufficient to effect luminescence of the point thereat, and the value of either wave alone being insufficient to accomplish phosphor excitation. Variation of the frequency of the applied waves will vary the point of occurrence of the standing waves on the lines, and thereby the point excited on the phosphor screen.

The present invention likewise employs the novel concept of establishing a coincident pulse of increased amplitude at a selected point along a line to control target excitation. In the present arrangements however, successive ones of an array of conductors are connected to successive intervals on such line, whereby the conductor which is connected most closely to the point on the line at which the coincident pulse occurs is energized by a signal of a distinctively larger value than the signal which occurs on the other conductors. In effect, an electronic selection of such conductor in the array is accomplished as the larger value coincident pulse is applied thereto.

In one arrangement disclosed herein, a first array of conductors is disposed adjacent one face of a phosphor layer and a second array including at least one conductor which is energized by a potential of a preselected value (as more fully disclosed hereinafter), is disposed adjacent the second face of the phosphor layer. With the occurrence of the coincident pulse on the selected conductor of the first array, the difference between the potential on such conductor and the potential on the second array conductor is of an order to excite the phosphor which lies between the coextensive portions of such conductors. Ostensibly if the conductors are thin wire members, or the like, the coextensive portion which is excited will be no more than a point.

The coincident pulse is established in one embodiment by transmitting a first pulse along a line which is conditioned to reflect same back toward the initial end of the line, and transmitting a second pulse along the line to intercept the first pulse in its reflected travel at a desired point along the line. The point of coincidence of the pulses is manifestly varied by adjusting the time of application of the second pulse to the line relative to the time of application of the first pulse thereto. In a second embodiment, the coincident pulse is established by coupling one pulse to one end of the line and a second pulse to the other end of the line, the relative time of application of the pulses to the different ends determining the point of coincidence on the line.

In both embodiments, the coincident pulse which results from the coincidence of two different pulses is of a substantially larger value than the individual pulses which are applied to the line, and the additional value is utilized in the selection of the different points in the display service.

More specifically, in one arrangement the successive ones of an array of conductors are connected to successive taps on a pulse delay line, and a double pulse generator is connected to transmit an impulse train consisting of at least two impulses over the pulse delay line with a controlled time interval introduced between the impulses of the train. The value of the time interval between the pulses of the train determines the point of coincidence on the line of the second pulse with the reflected first pulse, and the one of the conductors which is connected to the pulse line at the point of coincidence of the reflected first pulse and the second pulse is energized by the resultant coincident pulse signal. Manifestly, variation of the time interval between transmission of the first and second pulses will vary the point of coincidence of the reflected first pulse and the second pulse, and thereby the particular conductor which is so energized.

It is apparent that if the first array of conductors are placed adjacent one face of a phosphor layer and a second array comprising at least one conductor energized by a preselected potential is placed adjacent the second face of the phosphor layer, the portion of the phosphor layer which is between the pulse energized one of the conductors adjacent the first face and the conductor adjacent the second phosphor face will be caused to luminesce. In certain embodiments the value of the potential applied to the second array is sufficiently low to prevent excitation of the phosphor in response to the application of the first and second pulses alone to each of the conductors of the first array, and of a value to establish a potential difference with said coincident pulse which is sufficient to excite the phosphor. Such structure will, of course, be operative in like manner in response to the application of an impulse to each end of the line to energize the conductor located at the point of coincidence of the impulses.

Various ones of the embodiments of the present disclosure practice these basic concepts. In one particularly flexible embodiment, a larger display selection is provided by disposing a first array of conductors adjacent one face of the phosphor and connecting same for control by a first pulse line and an associated double pulse generator. A second array of conductors controlled by a second double pulse generator is disposed adjacent the second phosphor face, the conductors of the first and second arrays being disposed substantially perpendicular to one another. The conductors may be biased so that with the normal phosphor threshold (or biased threshold), luminescence of the phosphor is effected only responsive to the energization of at least one conductor in each of the arrays by a coincident pulse, the particular ones of the conductors thus energized being effective at their crossover points to excite the corresponding points in the phosphor layer.

Such arrangement may be further modified to provide a raster on the phosphor layer by providing signal control means for varying, in synchronized relation, the time between the pulses of each train applied to the first and second conductor arrays by the respective pulse lines. Assuming for purposes of example, that the first array of conductors is disposed in a vertical plane and the second array of conductors is disposed in a horizontal plane, it will be apparent that the time interval between the impulses of the impulse trains provided by the first pulse generator must be varied throughout the range necessary to energize each of the conductors of the vertical array once prior to variation of the time increment between the pulses in the trains provided by the double pulse generator for the horizontally disposed conductors. With such arrangement, as each successive vertical conductor is energized, successive points adjacent the first horizontal conductor are excited to accomplish the equivalent of a linear trace of the first line in a conventional cathode ray tube. Scanning of the next line is effected by varying the time interval between the impulses of the next group of impulse trains which are applied to the delay line for the horizontal conductor and is of an order to effect coincidence of the pulses at the point on the line to which the second horizontal conductor is connected, such group of trains being continued for a period sufficient to permit energization of each of the vertical conductors in a second cycle. The manner in which a complete raster is obtained is apparent from such disclosure.

Information sets may be displayed on the phosphor screen in its tracing of such raster by modulating the potential difference applied to the phosphor, and thereby the degree of excitation of the phosphor at each point. The applied potential difference is varied in one embodiment by modulating the double pulse generator for at least one delay line with the signal set to be displayed. In other embodiments the double pulse generator for both delay lines is modulated with the input signal set.

It is apparent that the novel scanning arrangement may also be utilized to provide a television picture presentation. In such arragement, the double pulse generator associated with the vertical conductors are controlled by the output of the horizontal sweep stage, such as is used in a conventional television receiver, and the double pulse generator associated with the horizontal conductors is controlled by the output of the vertical sweep stage, such as is used in a conventional television receiver. The signal outputs of the double pulse generator for at least one of the delay lines is varied in accordance with the output of the video amplifier stage of the receiver, it being apparent that the modulating signal representative of the video information can be applied to either of the double pulse generators or both. As shown hereinafter, application of the video signal to each of the double pulse generators may be utilized to effect increased modulation of the presentation.

These and other embodiments and features of the novel arrangement will now be apparent with consideration of the following more detailed description of the invention.

*Specific description of linear display device*

For exemplary purposes, various embodiments of the novel invention are shown hereinafter in their use with the so-called solid state tube. However, it will be readily apparent to parties skilled in the art that the same structure is readily incorporated in other types of display devices including the gas and vacuum type display units.

With reference first to Figure 1, there is shown thereat a display device of the type in which information sets are presented along a single line, different positions along the line indicating different values. Such type unit may be used in aircraft, for example, to provide information as to the altitude of aircraft, or the distance of other objects relative thereto; in ships, to provide the depth of water in a given location, or the relative distance of other objects; in commercial installations, to provide linear traces for use with facsimile reproduction equipment, and in many other applications.

Such arrangement may comprise a display device 10 which basically includes a first panel 12 of glass or other like material, a first conductor set including at least one electrical conductor 14, a phosphor layer 16, a second conductor set including a plurality of conductors 18 disposed at right angles to the first conductor 14, and a second panel 20 of glass or other suitable material. Each of the conductors 14 and 18 have at least one terminal, such as 31 and 22, respectively, for connecting energizing signals thereto, the device being operative with energization of the horizontal conductor 14 and a vertical conductor 18 to excite the phosphor located at the relative cross-over points of the energized ones of the conductor as more fully explained hereinafter. Many modifications of such basic arrangement are, of course, immediately apparent. The front and rear panels 12 and 20 may, for example, be of a material such as glass and the electrical conductors 14 and 17 may comprise a transparent conductive coating applied to the respective inner surfaces to form the conductors 14 and 18 thereon in a manner well known in the art. In such arrangement the display portion of the screen would ostensibly comprise the two coated panels 12 and 20 with a layer or film of phosphor 16 located therebetween. Alternatively the electrical conductors 14 and 18 may comprise grid wire members of such thinness as to be practically invisible. The two enclosing panels 12 and 20 may be semi-translucent rather than transparent to further reduce the effect of the presence of the conductors if desired. As shown hereinafter it may be preferable as an aid to the display presentation in certain embodiments to provide conductors which are readily visible. It is significant to note that with the use of transparent phosphor and transparent conductive coatings for the conductors (or alternatively extremely fine wire conductors), the display will be visible from both sides of the device.

The number of vertical conductors and the width of conductors 14 and 18 will, of course, vary with the intended application and the degree of resolution desired. The conductor 14 is illustrated in Figure 1 as a single thin line conductor. However, such conductor might well comprise a conductive coating which covers the entire inner face of panel 12. In such event, whenever a vertical conductor 18 and layer 14 are energized simultaneously, a vertical line display would be presented on the phosphor portion which is coextensive with the energized one of the conductors 18. The phosphor layer 16 may likewise comprise its illustrated size wherein the phosphor is coextensive with the boundaries of the vertical conductor 18; or alternatively a single narrow band similar in width to conductor 14; or a preselected section of the illustrated layer, the exact nature of the presentation desired determining the nature of the phosphor layer to be used. The electroluminescent phosphor or film may comprise any of the well known types of dielectric suspensions of phosphor particles, such as cadmium sulphide, zinc sulphide, zinc oxide, zinc selenide, etc. and mixtures thereof activated with copper manganese, aluminum silver, etc.

It is further apparent that scale markings, such as distances, depths, altitudes, etc., may be predisposed on the panels 12 and 18 for comparison purposes, or if preferred, separate scale marking devices may be prepared for attachment to the outer face of the panel 12 and/or 20. Other modifications of the basic display device will be readily apparent from the foregoing teaching.

With reference to Figure 2, the novel selector circuit of the invention is illustrated in its connection with the solid state display device of Figure 1, and as there shown, the device basically comprises a double pulse generator 24 having a coupler plug 26 for connecting same to an energizing source, such as a conventional 60 cycle, 110 volt source; an input circuit 28 over which the signals representative of the information to be displayed are coupled to the double pulse generator 24; an output circuit 29 over which the generated pulse trains are transmitted, a pulse delay line 30 and a plurality of receptacles 32*a*—32 last for coupling the output of the pulse delay line 30 to the successive ones of the vertical conductors 18—18 last of the display device 10. An output circuit 31 extends energizing potential to the horizontal conductor 14, such potential being of fixed value if desired, or alternatively a potential which is modulated by the input signal as applied to the input circuit 28 for the double pulse generator 24.

It is noted that the terminals 22 for the vertical conductors 18 and the receptacles 32 for the delay line are shown in alignment primarily for exemplary purposes. The actual physical length and the electrical length of the delay line are not related in such fashion to the width of the target, and in fact, can be much shorter than the target as shown in a subsequent embodiment.

The double pulse generator 24 may comprise a free running multi-vibrator in certain applications, and a triggered multi-vibrator in other arrangements, the multi-vibrator in either embodiment being of the conventional type which may be adapted to provide two pulses over separate output circuits responsive to each flip-flop thereof, and which are adjustable in response to a variable input signal to correspondingly vary the time interval between the two pulses of each train. One typical circuit which is thus operative has been set forth in "Electron Tube Circuits"—Seeley—1950 edition, page 401. The specifics of the multi-vibrator circuit will, of course, vary in the application of the device to different uses, and the disclosed arrangement is not to be considered limiting of the invention scope.

In one illustrative embodiment specifically shown in Figure 4, the double pulse generator 24 comprises a two-stage, resistance-capacitance coupled amplifier having a first and second amplifier tube 46, 54, respectively, the outputs of which are extended over individual differentiating circuits 76 and 88 respectively, to a pair of diodes 82, 94 which selectively extend the positive portion of the derivative pulse output of the differentiating circuits 76, 88 to an amplifier stage 102 for amplification and coupling to the delay line 30. A conventional power source 29, such as the type utilized in commercial television and radio circuits is utilized to supply power for the double pulse generator.

More specifically, double pulse generator 24 includes a first stage consisting of a conventional amplifier tube 46 having anode 48, grid 50 and cathode 52, and a second stage including an amplifier tube 54 having anode 56, grid 58 and cathode 60. An input circuit 62 connected to signal input circuit 28 includes resistance 64 which couples the incoming signals to the grid 50 of the first amplifier tube 46. Anode 48 is connected over plate resistance 66 to the 300 volt B+ tap of power source 29, and is coupled over capacitor 68 to the grid 58 of the second amplifier tube 54, the coupling circuit being also connected over resistance 70 to ground. In the second stage, anode 56 is connected over plate resistance 72 to the 300 volt B+ terminal on power source 29, and is coupled over capacitor 74 to the grid 50 for the amplifier tube 46 of the first stage. Cathodes 52, 60 of the first and second amplifier tubes are connected to ground.

The output circuit of the first and second amplifiers 46, 54 are coupled to differentiating circuits 76 and 88 respectively, the differentiating circuit 76 including capacitor 78 and resistance 80 and the differentiating circuit 88 including capacitor 90 and resistance 92. Diode 82 having anode 84 and cathode 86 is connected between the differentiating circuit 78 and the input circuit of the amplifier stage 102, and diode 94 having anode 96 and cathode 98 is connected between the differentiating circuit 88 and the input circuit for the amplifier stage 102. Amplifier stage 102 includes an anode 104, grid 106, cathode 108. Anode 104 of the amplifier tube 102 is connected over plate resistance 101 to the 300 volt B+ terminal of power source 29; grid 106 is connected to cathodes 96, 98 of diodes 82, 94, and over resistance 100 to ground; and cathode 108 is connected over resistance 103 and capacitor 105 to ground. The anode circuit of the amplifier tube 102 is coupled directly to delay line 130.

As shown hereinafter, the illustrated double pulse generator 24 is operative to effect the repeated transmission of a series of impulse trains, the time interval between the impulses in each train being determined by the value of the signal received over the input circuit 28 for the double pulse generator 24. Variations of such signal changes the time interval between the pulses of each train, and thereby the point of coincidence of the pulse on delay line 30.

The delay line 30 may be of any one of a number of lines now available in the art, the general nature of which is shown in Waveforms, book 19, Radiation Laboratory Series, page 730. The network as shown in Figure 4, and the cited reference, basically comprises a plurality of successively connected combinations of inductors 107 and capacitors 109, the rise time, impedance and length of the line being, of course, determined by the nature of the application. In one embodiment, such as is used in an indicator type display device, a delay line having a five microsecond length with a .05 microsecond rise time and 1,000 ohm impedance is considered acceptable.

Such values will vary, as noted above, as different degrees of resolution are desired. Taps connected between each successive combination are coupled to receptacles *32a*—32 last which are in turn coupled over terminals 22*a*—22 last to the vertical conductors 18, whereby a pulse travelling along the delay line 30 appears at each successive one of the vertical conductors 18, the time of appearance on successive taps being delayed by successive time periods. Delay lines now known in the art are extremely compact, certain types, for example, utilizing printed-wire circuits and miniature toroidal wound coils with silver mica capacitors, wherein several hundred units are compacted into an extremely small space. The delay line 30 may be of the lumped constant type, as illustrated and described, or of the distributed constant type. In the embodiments in which a point is selected in response to coincidence of a second pulse with a first reflected pulse, the delay line is an unmatched line. In the embodiments in which the first pulse is coupled to one end of the line and a second pulse is coupled to the other end of the line, the line is terminated at each end of the line by the impulse generator which is located thereat.

Since the physical length of the delay line is not necessarily the width of the target sweep, a completed structure may take the form, for example, of the device shown in Figure 3, wherein the delay line 30 and the double pulse generator 24 are located side by side in the bottom portion of a housing 38, and the power coupling plug 26, and signal coupling plug 28 may be located in the back. Transistor components may be used to provide a pulse generator of reduced size where necessary. The plug-in members 22, 32, 29, 31 illustrated in Figure 2 permits convenient and ready interchanging of the element of the device, however, other terminal arrangements may prove more expedient in certain applications.

Scale markings 40 may be printed on the panel 12 and/or 20, or the housing 38 may include a window 42 which may have the scale markings predisposed thereon. Such window may be mounted for ready disassembly to permit replacement thereof by a different marked window for use in accomplishing different measuring functions. Other modifications of the device will be readily apparent to parties skilled in the art.

*General operation of linear display device*

As noted above, the display device 10 of Figure 1 is adapted to provide a linear presentation of the information supplied thereto by the signals received over input circuit 28.

Assuming that the power coupling plug 26 of the unit is connected to a conventional 60 cycle, 120 volt power supply, the free running double pulse generator 24 operates to repeatedly generate impulse trains comprised of a first and a second impulse separated by a predetermined time interval, the pulse trains thus generated being applied over coupling circuit 29 to delay line 30 for transmission along the length thereof. As the first pulse travels along the length of the line to the remote end and is reflected back toward the initial line end, the double pulse generator 24 transmits the second impulse over the line to meet the reflected impulse at a predetermined point along the line. At the point of coincidence of the two impulses, a coincident pulse of greater than their combined amplitudes results, and the signal of increased amplitude appears on the one of the taps 32 which is connected to such point on the line and on the vertical conductor 18 which is connected thereto. The potential difference between the signal on the vertical conductor 18 which is thus energized and the potential on horizontal conductor 14 is of a value to cause the phosphor 16 which is located between the intersecting conductors 14 and 18 to luminesce.

The specific manner in which the device is operated to effect presentation of incoming information sets on the display device is now set forth. With reference to Figures 2–4, it is apparent that the double pulse generator 24 is enabled by connecting the power coupling plug 26 to a 60 cycle 110 volt power source, to thereby energize a conventional power supply 29 in the unit, such supply being adapted to provide the necessary operating potentials, such as the 300 volt B+ for the plates of the tube components in the double pulse generator 24 and biassing voltages for the conductor 14 as required.

With the energization of the power supply 29 to effect the application of 300 volt B+ to the plates 48, 56 of the tubes 46, 54, and in the absence of a control signal on signal input circuit 28, the anode current in one of the tubes 45, 54 will start to rise, and the rising current effects application of a negative going signal to the grid of the other of the stages. Assuming for purposes of illustration that the anode current in the amplifier tube 46 of the first stage is increasing, a negative going signal is coupled to a differentiating current 88 and also over capacitor 68 to the grid 58 of the amplifier tube 54 in the second stage. Amplifier tube 54 is biased less conductive by the negative going signal, and as the conductivity of tube 54 decreases, a positive going output signal is coupled to the differentiating circuit 76. The positive going signal is also coupled over capacitor 74 to the grid 50 of the first amplifier tube 46 causing the grid 50 to become more positive, and thereby to further increase the conductivity of tube 46 in the first stage. Such action of the two stages is cumulative, each increase in the plate current of the tube 46 in the first stage further controlling the amplifier tube 54 in the second stage to provide a signal for increasing the conductivity of the tube 46 in the first stage.

As the amplifier tube 46 in the first stage is driven to maximum conductivity, the negative potential coupled over capacitor 68 to grid 58 of the amplifier tube 54 in the second stage effectively biases the second stage tube to cutoff. During the period in which the second stage tube 54 is biased to cutoff, the charge on capacitor 68 leaks away over resistor 70 to ground, and the potential applied to the grid 58 of the second stage tube 54 eventually is reduced to the point at which the tube 54 again becomes conductive. As the second stage tube becomes conductive, a negative going output signal appears in the output circuit thereof and is coupled to the differentiating circuit 76 and also over capacitor 74 to the grid 50 of the first stage tube 46. As the conductivity of the first stage tube 46 is correspondingly reduced, a positive going signal is coupled to the differentiating circuit 88 and over capacitor 68 to the grid 58 of the second stage tube 54 to bias same to increase the conductivity thereof. The two stages now assist each other over the resistance-capacitance coupling thereof to drive the second tube stage 54 to full conductivity and to bias the first stage tube 46 to cutoff. As such point is reached a "flip-over" is once more effected.

It is apparent that with each cycle of the multivibrator 44, two simultaneous impulses are transmitted to the associated differentiating circuits 76 and 88, the output of each stage being indicated schematically in Figure 4. In a free running connection of the type shown in Figure 4, the multivibrator 44 automatically effects repeated transmission of such impulses.

The differentiating circuits 76 and 88 are operative responsive to receipt of each pulse from the multivibrator to provide a positive and negative derivative pulse according to the well known practice (Waveforms, Radiation Laboratories Series, book 19, page 649). In that the pulse output of the differentiating circuits 76 and 88 are connected to the anodes 84 and 96 of the diode rectifiers 82 and 94 respectively, and the cathode 98 is normally connected over resistor 100 to ground, the diodes will conduct only in response to the application of the positive derivative pulse to the anodes thereof, and as a result the diodes transmit only the positive portion of the derivative pulses over the input circuit to the grid 107 of the amplifier stage 102.

Since the diodes 82, 94 are operative to couple only the positive derivative pulses to grid 106, and the pulse input to the differentiating circuits 76 and 88 are out of phase, the two positive impulses are applied to the amplifier stage 102 at different intervals by the diode rectifiers 82 and 94 to provide a train of two impulses. Amplifier stage 102 operates in the conventional manner to amplify the signals input to the grid 106, and two corresponding negative going pulses which appear in the plate circuit thereof are coupled, as a train, to the delay line 30.

The length of the time interval between the successive impulses of each train generated by the multivibrator 44 and applied to the differentiating circuits 76 and 88 is determined by the value of the modulating voltage applied over the input circuit 28. That is, by applying a voltage of a larger value to input circuit 28, capacitor 74 charges more quickly, and as a result, the first stage tube 46 is biassed to conduct in a shorter period, whereby the intervals between successive pulses is reduced correspondingly. In a similar manner, as the value of the applied modulating voltage is reduced capacitor 74 charges more slowly, and the time interval between successive impulses of each train is correspondingly lengthened. The impulse trains thus generated are applied to the delay line 30, and each train of two impulses thus transmitted effects excitation of a point on the display device, the point excited being determined by the length of the time interval between the successive pulses, and the time interval in turn, being dependent upon the modulating voltage applied to input circuit 28.

With reference to Figure *5a–5c*, there is shown in graph form thereat, the manner of travel of the pulse trains along the delay line 30, and the manner in which a coincident pulse is achieved to effect selection and energization of a particular one of the conductors 18. With reference first to Figure *5a* the vertical axis of the graphic drawing represents the amplitude of the pulses as coupled to delay line 30 by the double pulse generator 24 and the horizontal axis represents the relative length of the delay line 30, the markings on the horizontal axis indicating the different taps 32 on the delay line 30 and the vertical conductors 18 connected thereto. For simplicity of explanation, only a portion of the taps and conductors are illustrated in the various figures.

The pulse in Figure *5a* represents the first pulse of a train as coupled to the delay line 30. Figure *5b* shows the first pulse following reflection thereof at the end of the pulse line, and the reduced amplitude of the pulse as reflected. For purposes of illustration, it is assumed that a minimum modulating voltage is initially applied to input circuits 26 and 62 of double pulse generator 24, and that the generator circuit is adjusted to effect the application of the second pulse of each train to the line at the time the reflected pulse has returned to the input end of the pulse line. It will be apparent that the coincident pulse resulting from the meeting of the first pulse as reflected and the second pulse will, under such conditions, occur at the tap 32 which is connected to the first vertical conductor 18, and as shown in Figure 5*c*, the potential on conductor 18*a* will be increased by a corresponding value.

The potential normally applied to horizontal conductor 14 is selected to establish with the coincident pulse thus produced, a potential difference which is sufficient to excite the phosphor which lies therebetween, and of a value which is insufficient to effect excitation of the phosphor with the application of the individual pulses to the successive conductors 18 in their travel down the delay line 30. Thus none of the points along the line will be illuminated by the first pulse in its travel down the line, and in its reflected travel along the line until its coincidence with the second pulse of the train. In the present example it is assumed that in the absence of an input signal to the pulse generator 24, such coincidence occurs at the first tap 32 on the delay line 30, and accordingly the point adjacent the vertical conductor 18*a* will be energized thereby (Fig. 3).

Assuming now that a visual representation is to be effected at a point which is located one third of the distance along the line, point 18 (⅓ L), an input signal which represents such condition is applied to the input circuit 28, 62 for the pulse generator 24 which is operative responsive to application of the increased voltage of the input signal to effect a decreased charging period for the capacitor 74 in multivibrator circuit 44, and thereby adjust the time interval between successive impulses to a smaller value.

With reference to Figure 5*d*, it will be apparent that such signal results in the coupling of the second pulse to the delay line 30 at the approximate time that the reflected pulse has returned one third of the distance along the pulse to tap line 18 (⅔ L), whereby the coincident pulse will occur at the tap 32 which is located at one third of the length of the pulse line, and the increased amplitude of the pulse is coupled to the vertical conductor 18 (⅓ L) which is connected thereto to effect excitation of such point on the phosphor screen (Figure 3).

A positive or negative bias may be applied to horizontal conductor 14 to adjust the threshold of response of the phosphor to the coincident pulses, it being apparent with reference to Fig. 5*f* (1) that by applying a positive bias to the conductor 14, only the peak potentials of the coincident signal are effective to excite the phosphor. Such arrangement takes advantage of the sharpness of the peak of the coincident impulse, and permits the use of pulsing apparatus having a higher frequency rate of pulse generator. Likewise as shown in Fig. 5*f* (2) a negative bias may be applied to effect a greater differential between the applied negative bias signal and the coincident pulse, whereby increased phosphor excitation is obtained. The degree of excitation of the phosphor, and therefore the brilliance of each point of the display may be modulated by applying modulating signals over input circuit 99 to the plate circuit of the amplifier stage 102, plate modulation in this manner being well known in the art. Grid modulation may also be effected, if preferred, by connecting the input circuit 99 to the grid 106 of the amplifier stage 102, and also between resistor 80 and ground, and between resistor 92 and ground to effect a balanced modulation of the generator pulse output.

As noted above, in most applications the amplitude of the impulses in the trains transmitted by the double pulse generator 24, and applied to the vertical conductors 18 in its travel therealong, is selected to be of a value which with the potential on conductor 14 is less than the potential value which will effect excitation of the phosphor located therebetween. However, in certain applications it may be desirable to provide a visual display of vertical line sets for scale purposes, etc. and in such event conductor 14 is replaced by a transparent or translucent conductive coating on the rear face of panel 12. Since energization of the vertical conductor 18 by a coincident pulse will result in the energization of the portion of the phosphor located between the vertical conductor 18 and the conductive coating 12, a vertical line, such as shown at "Y" (Fig. 3) will be provided on the screen.

Such arrangement may be further modified by biasing the conductive coating 14A sufficiently to provide a bare excitation of the phosphor by the circuit at conductors 18 as the transmitted impulses travel down the pulse line, to thereby provide a scale background for the display. The particular one of the conductors 18 which is located at the point of occurrence of the coincident pulse will, of course, be energized more brightly and is therefore discernible from the other markings. These and other modifications of the line on display device will be obvious to parties skilled in the art, and previous disclosure is considered to be exemplary, rather than limiting, of the basic concepts of the invention.

*Horizontal and vertical conductor display device*

Discrete sets of information are presented on a display device in a second embodiment of the inventive concept by selectively energizing different ones of a plurality of points on a phosphor screen, the points being located at the intersection of the different ones of a first array of conductors with the different ones of a second array of conductors, and the arrays being disposed with the conductors of one array substantially perpendicular to the conductors of the other array. For exemplary purposes, the novel arrangement is now described in its use to selectively energize the different points on an electroluminescent display device, it being obvious therefrom as to the manner in which such switching system may also be utilized to energize the display devices of the gaseous and vacuum tube types.

The electroluminescent display device in one preferred embodiment basically comprises two conductor arrays which are disposed with a layer of phosphor therebetween, and an electronic selector circuit which selectively applies a signal to one conductor in the first array, and simultaneously a signal to a conductor in the second array, the signals being of a combined value which is sufficient to effect excitation of the phosphor at the point of crossover of the conductors thus energized.

Figures 5, 6, 7, 8, 9:
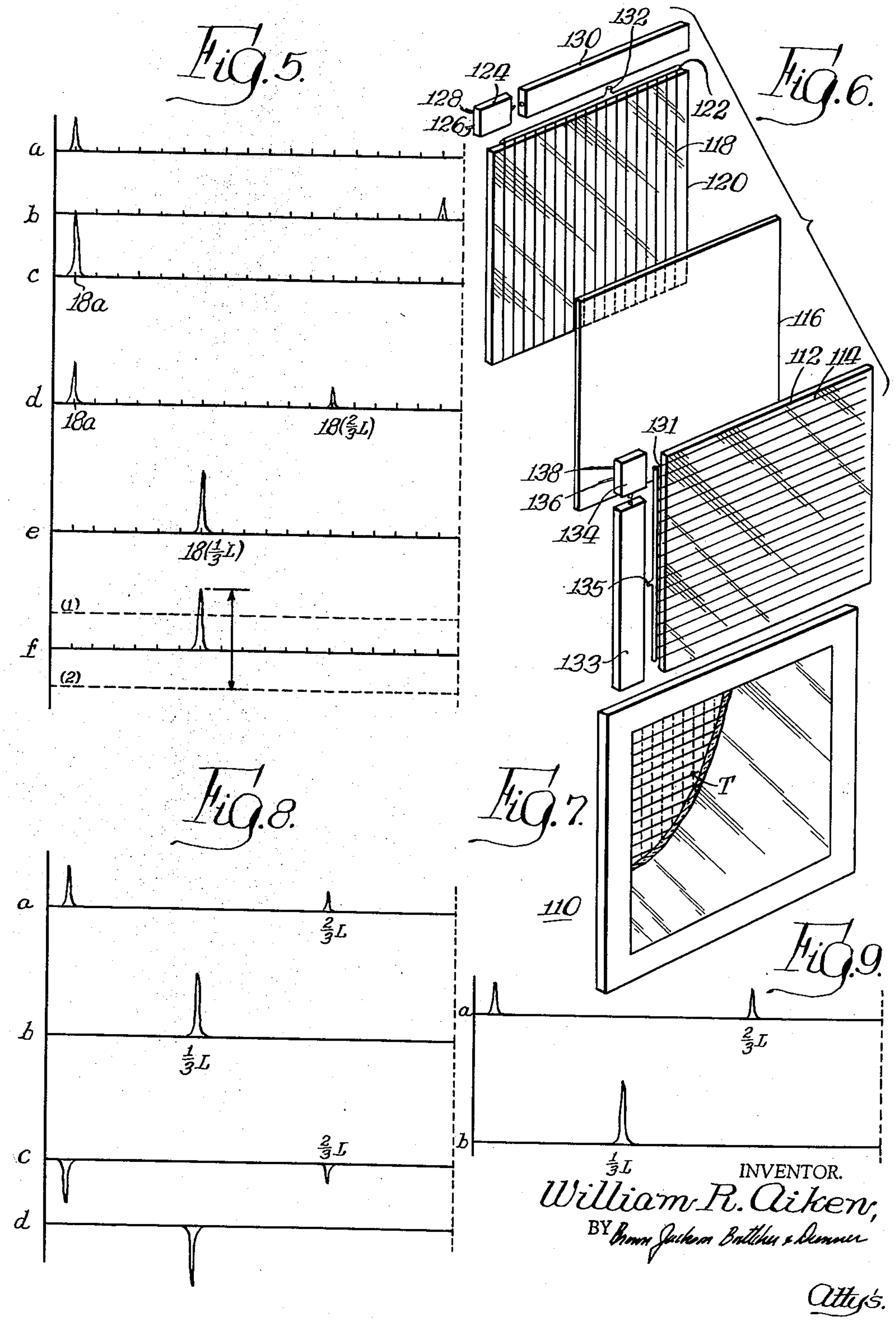
Figure 5 illustrates graphically the manner of operation of the device of Figures 1–3 to effect excitation of different points on the display device.
Figures 6 and 7 illustrate an additional embodiment of a solid state display device including the novel scanning arrangement.
Figure 8 illustrates graphically the manner of operation of the display device of Figures 6 and 7.
Figure 9 illustrates in graph form, a modification of the circuit selection concept.

With reference now to Figures 6 and 7, there is shown thereat an electroluminescent cell 110 which includes basic elements similar to those shown in the embodiment of Figures 1–3. In the present arrangement, however, an array of horizontal parallel-spaced electrical conductors 14 are disposed between the panel 112 and one face of the layer of electroluminescent phosphor material 116 (the previous embodiment having illustrated a single horizontal conductor 14). A plurality of vertically-disposed parallel-separated electrical conductors 118 form a second array which is disposed between the second face of the phosphor layer and the panel 120. One end of each of the vertically disposed conductors 118 extends outwardly from the marginal edge of the layered arrangement to provide terminals 122 for connecting successive ones thereof to the successive taps on an associated delay line 130. In a similar manner the ends of the horizontally disposed grid members 114 extend outwardly of at least one of the marginal edges of the screen to provide terminals 131 for connection to the successive taps of a delay line 133 associated therewith. Since there is no relation between the electrical length of the line and the length of the sweep, the delay lines 130 and 133 do not necessarily have to be of the same length. The number of conductor members 114, 118 is, of course, determined by the nature of the resolution desired in the presentation, and as in the previous embodiment may comprise either grid wire members, or conductive materials coated on the inner faces of the front and rear panels; or any other of a number of well known grid arrangements.

The phosphor layer 116 may comprise, as in the first embodiment, any of the well known electroluminescent phosphor materials conventionally utilized in such application. The delay lines 130 and 133, and the associated double pulse generators 124 and 134 may likewise be similar in structure to those described in the embodiment illustrated in Figures 1–3. In the general arrangement, the double pulse generator 124 including power coupling conductors 126 and signal input coupler 128; and the double pulse generator 134 including power coupling conductor 136 and signal input circuit 138 are connected to energize the delay lines 130 and 133, respectively. The pulse output of the double pulse generator 124 is coupled over the successive taps 132 on the delay line 130 to the successive ones of the terminals 122 for the vertical conductors 118, and the output of delay line 133 is coupled over successive taps 135 on the delay line 133 to the successive terminals 131 of the conductors 114 in the horizontal array. In the illustrated embodiment the pulse output of the generators 124 and 134 are of opposite polarity. Briefly, the pulse generator 24 shown in Figure 4 may be modified by adding a second amplifier stage, such as 102, between the output of stage 102 and the delay line 133 connected thereto, whereby the signal output will be opposite in polarity to that shown in Figure 4. Such modification is within the skill of the art, and does not warrant a separate illustration.

The presentation of an information set on the phosphor screen is accomplished by establishing a coincident pulse over delay line 130 to energize a vertical conductor 118, and simultaneously therewith establishing a coincident pulse on delay line 133 to energize a horizontal conductor 114, the portion of the phosphor which is disposed between the crossover of the horizontal and vertical conductors thus energized being activated in response thereto.

It is assumed, for exemplary purposes, that in the free running condition the double pulse generators 124 and 134 are adjusted to transmit repeated sets of impulse trains, wherein the second pulse of each train just fails to meet the first pulse as reflected down the line. It is to be understood that the pulse generator may also be adjsuted so that the second pulse meets the first pulse just as it has been reflected along the full line length so that the phosphor at the point of crossover of the first horizontal conductor and the first vertical conductor are energized to provide an illuminated point in the upper left hand corner of the screen. Such point may, of course, be blanked off by suitable nontransparent material, or may be circumvented by not connecting either the first horizontal terminal 131 or the first vertical conductor 122, or both, to their respective delay lines.

For purposes of discussion, consideration is first given to the manner of effecting energization of a point on the phosphor film which is located one third of the distance between the top and bottom marginal target edge, and one third of the distance between the side margin edges (point T in Figure 7).

In such operation, the input signal applied to input circuit 128 for the double pulse generator 124 is of a value to reduce the time interval between the two impulses of the train sufficiently to cause the coincident pulse to occur at the point of connection of the delay line to vertical conductor 118—⅓ L, and the signal applied to the input circuit 138 for the double pulse generator 134 is of a value to reduce still further the time interval between the two impulses of each train generated thereby, and specifically to effect the establishment of the connected pulse at the point of connection of the delay line 133 to horizontal conductor 114 (⅓ L).

It is apparent that in certain displays, the horizontal and vertical impulse trains must be coupled to the delay lines in proper timed relation to one another to provide simultaneous energization of the proper horizontal conductor as each vertical conductor is energized in sequence. In such arrangements, grid 58 of the second stage tube 54 in the double pulse generator 24 is modulated by suitable signal coupled thereto over an input circuit (not shown) connected between resistor 70 and ground, the signal waveform being shaped to adjust the time interval between successive trains applied to the delay line 133 to a successively smaller value as each successive vertical conductor is energized in the sequence. Other methods of accomplishing such synchronism will be obvious to parties skilled in the art.

In the present embodiment, the delay line 130 for the vertical conductors 118 is connected to provide a positive pulse output, and delay line 133 for the horizontal conductors 114 is connected to provide a negative pulse output, whereby the potential difference at the point of crossover is the difference between the amplitude of the two pulses. The pulse output of pulse generator 124 in response to such input signal is shown in Figure 8*a*, the second pulse of the positive pulse train being supplied by the pulse generator 124 to delay line 130 at the approximate time the first pulse, as reflected, is at a point two thirds along the line length, whereby the two pulses coincide at a point one third along the length to energize vertical conductor 118 (⅓ L) connected thereto (Figure 8*b*).

In a similar manner, as shown in Figure 8*c*, the pulse generator 134 applies a second negative pulse to delay line 133 at the approximate time the first negative pulse, as reflected, is at a point ⅔ along the line, whereby the two pulses coincide at the point at which horizontal conductor 114 (⅓ L) is connected to delay line 133, as shown in Figure 7*d*.

It is apparent therefrom that the difference of potential appearing across the conductors 118 (⅓ L) and 114 (⅓ L) will be the sum of the amplitudes of the two coincident pulses of opposite polarity which appear thereon, which amplitude is of a value selected to excite the phosphor film located between such conductors to luminescence (point T—Figure 3).

Figure 13:
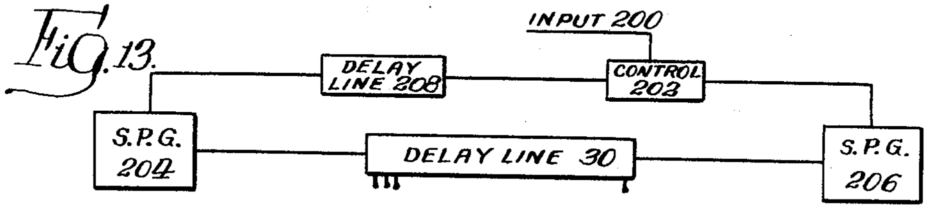
Figure 13 is a schematic view of an embodiment of the circuit selection concept set forth in Figure 9.

As shown schematically in Figure 13, the same basic concept of circuit selection may be utilized in an embodiment in which a first impulse is coupled to one end of the line and a second impulse is coupled to the remote end of the delay line in timed relation therewith, the relative time of application determining the point of coincidence of the pulses on the line, and accordingly the tap which is selected thereby.

Briefly, an input circuit 200 is connected to couple input signals to a control circuit 202, which signals vary in a characteristic, such as voltage, to provide an indication of the different items of information to be displayed. A first single pulse stage 204 is connected to terminate one end of the delay line 30 and a second single pulse stage 206 is connected to terminate the remote end of the delay line 30, each of the stages being operative as energized to couple a control pulse to the delay line 30 at its associate end. Control circuit 202 is operative to vary the time of application of the impulses at the respective ends of the line to coincide at the particular point on the line at which the tap to be energized is connected. Since the pulses are applied at the respective line ends, there is no need for a reflected pulse, and in the present embodiment the generators 204 and 206 may be designed to electrically terminate the line at either end.

The single pulse generators 204 and 206 may each comprise an amplifier stage, such as 102 (Figure 4), and have the grid circuits thereof, such as 106, connected to the separate outputs of control circuit 202, and the plate circuits, such as 104, connected to the associated end of the delay line 30.

Control circuit 202 which supplies the energizing signals to stages 204, 206 respectively, may comprise a modified double pulse generator of the type set forth in Figure 4, the outputs of the respective diodes 82, 96 being connected to input circuits (grids 106) of the respective stages 204, 206, in lieu of the single stage 102 of Figure 4.

As shown in Figure 13 a delay line 208 is also connected between the output diode 82 and the input circuit for stage 204 to introduce a fixed delay into the signal input thereto which is equal in value to one-half the length of the delay line.

With delay line 200 in the system, the pulses applied to stage 204 by the control circuit 202 may be delayed until such time as the pulse applied over stage 206 has traveled the entire length of the delay line 30, and the first coincident pulse is thus caused to occur at the first tap 22. As an input signal is applied to the modulating circuit 28, the time interval between the successive pulses of each train is reduced, and the pulse applied by stage 206 will be applied at a relatively later interval, whereby the pulse applied by stage 204 will advance to the second tap 22 prior to the coincidence thereof with the pulse output of stage 206. The manner of effecting coincidence of the pulses at different points along the line by adjusting the signal input to circuit 200 (input circuit 28 in Figure 4) is obvious therefrom.

The use of an arrangement in which pulses are applied to the different ends of the line in this manner results in an increased light output in that the embodiment permits doubling of the frequency input to the delay line, and increased frequency provides increased phosphor luminescence. Further the fact that each pulse is transmitted as generated results in the provision of a coincident pulse which is of increased amplitude as compared to the coincident pulse which results from the meeting of a second pulse with a reflected pulse.

It is noted that the illustrated structure for applying separate pulses to the respective ends of the delay line 30 in a relative timed relation has been included for exemplary purposes and is in no way to be considered limiting of the manner in which such concept is practiced. It is apparent, for example, that each stage 204, 206 could have input circuits which are connected to separate control stages in lieu of the common control circuit 202 illustrated herein. It is equally apparent that other known forms of pulse timing arrangements may be readily utilized in lieu of the illustrated control circuit 202 and delay line 208 to effect the relative times of transmission of the two pulses in each operation. These and other modifications within the scope of the invention will be apparent to parties skilled in the art.

The foregoing disclosure sets forth a novel scanning device which is operative to selectively energize the different points on an electroluminescent cell. Such basic concept is also utilized in the provision of a raster, and as shown in Figure 10 is adapted for use in the presentation of a television display.

Figures 10, 11, 12:
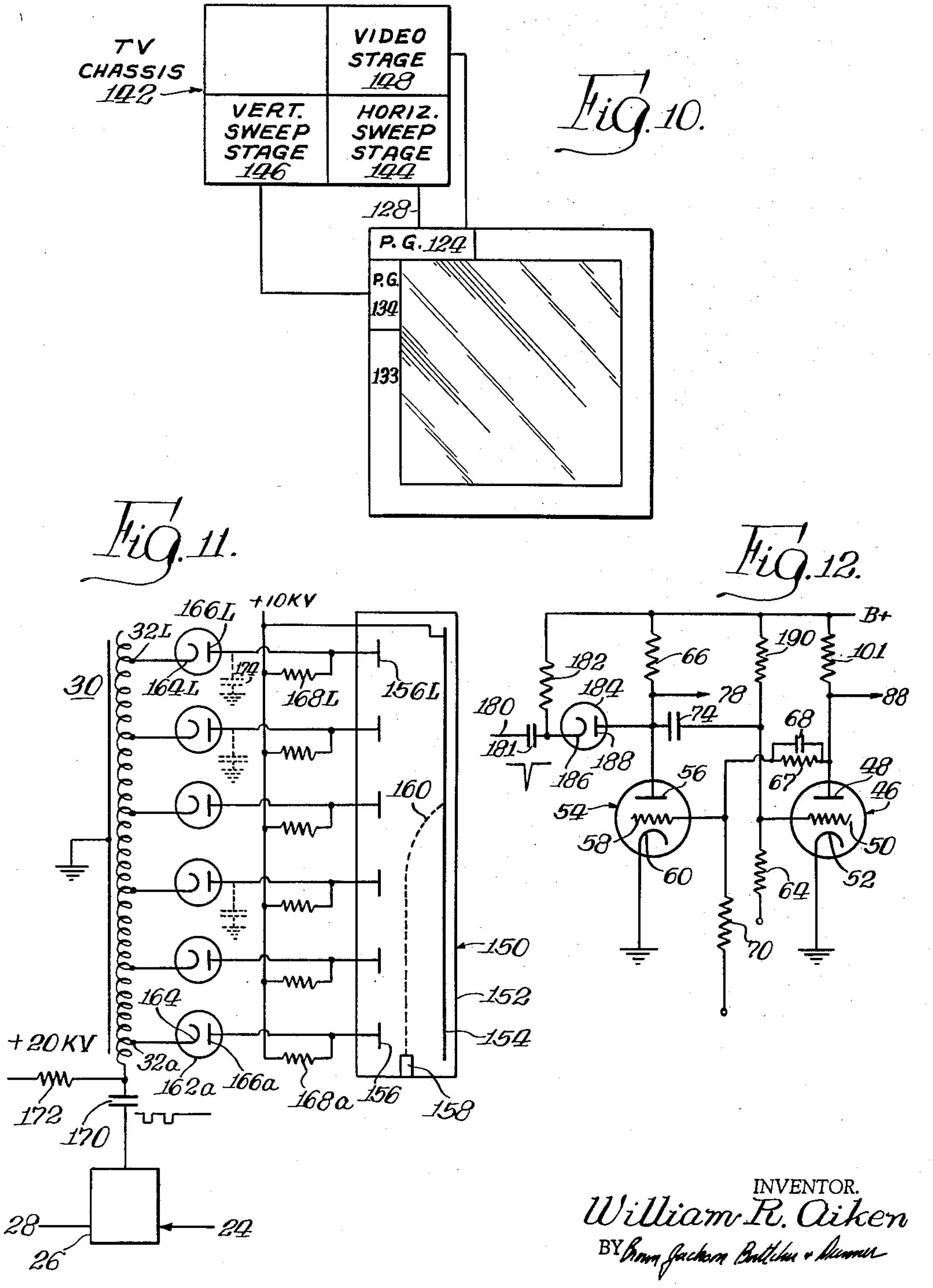
Figure 10 illustrates in schematic form, the manner of connecting the display device to reproduce incoming television signals.
Figure 11 is a schematic view of the novel scanning circuit in its use in the switching of an Aiken thin cathode ray tube.
Figure 12 is a schematic view of a modification of the circuitry shown in Figure 4.

With reference to Figure 10, the method of connecting the display device of Figures 6 and 7 to provide a television display is illustrated thereat. Briefly the display device 110 and associated scanning arrangement of Figures 6 and 7 is shown in its connection to a conventional television chassis 142, it being apparent to parties skilled in the art that a simplified circuit arrangement may be readily provided for the display device and that such manner of connection is primarily used for purposes of a simplified illustration. In such connection the horizontal sweep stage 144 has its output connected to the input circuit 128 of double pulse generator 124 for delay line 130 which controls the selection of the vertical conductor 118, and the vertical sweep stage 146 has its output connected to the iuput circuit 138 for the double pulse generator 134 for delay line 133 which controls the selection of the horizontal conductors 114. The output of the video amplifier stage 148 is connected to modulate the pulse output of the double pulse generator 124, such connection being made to the input circuit 99 (Fig. 4) in the manner previously described. Ostensibly the output of the double pulse generator 134 may be modulated in a similar manner to effect an increased degree of modulation.

In operation the horizontal sweep output consisting of a sawtooth waveform effects energization of each of the vertical conductors in succession, the rising slope of each sawtooth waveform effectively modulating the double pulse generator 124 to provide a series of impulse trains having from a maximum to a minimum time interval between the pulses thereof. As each successive sawtooth wave is applied to the double pulse generator 124, a successive cycle of the vertical conductors is effected.

Simultaneously, the sawtooth output of the vertical sweep stage 146 is applied to the double pulse generator 134 to effect progression of the sweep once in a vertical direction. In that the vertical sweep is at a substantially slower frequency, a plurality of impulse trains having the same time interval between the impulses thereof are generated prior to each changing of such time interval, the number of such trains in one embodiment being consistent with the number of vertical conductors 118. For example, during the period that the waveform output of the vertical sweep stage 146 is of a value to control the double pulse generator 134 to provide a coincident pulse for the first horizontal conductor 114, the waveform maintains such condition for a period sufficient to permit the double pulse generator 134 to provide a number of coincident pulses of a value which is consistent with the number of vertical conductors. In this manner, a pulse is applied to the first horizontal conductor 114 as each successive vertical conductor 117 is energized by the delay line 130.

The successive points defined by the intersection of the vertical conductors 118 with the first horizontal conductor 114 are thus energized successively to provide a trace of the upper line of the raster. In the disclosed embodiment the pulse output of the amplifier stage in the double pulse generator 124 is modulated according to conventional practice by the video signal output of the television chassis 142, whereby the amplitude of the pulse applied to each vertical conductor 118 is representative of the incoming video signal to be displayed at such points in the presentation. The variation of the amplitude of the signal applied to the vertical conductors 118 in turn effects a corresponding variation in the potential difference between that vertical conductor and the horizontal conductor energized in the particular cycle (or horizontal scan). Variation of the potential difference in such manner effects a corresponding variation in the phosphor excitation at the different points, and thereby reproduction of the television image represented by the incoming signals.

It is apparent that such arrangement may be readily modified to incorporate additional controls. Thus the output of the video stage 148 may also be connected to modulate the pulse output of the double pulse generator 134, whereby increased modulation of the display device is obtained. Other similar modifications of the control circuitry will be readily apparent to parties skilled in the art without departing from the scope of the invention.

A novel vacuum type display device including the novel switching arrangement of the invention is set forth in Figure 11, the display unit in such arrangement comprising a thin Aiken type cathode ray tube in which a beam is delivered between a series of deflection plates and a target for selective deflection by the deflection plates into the desired points on the target.

A display device 150 which provides a linear trace display is schematically shown in Figure 11, and as there illustrated basically includes an envelope 152, a target 154, an array of deflection plates 156*a*—156L disposed in parallel spaced relation with the target 154, and a cathode ray gun 158 disposed to deliver a beam 160 between the target 154 and the deflection plates 156*a* for selective deflection by the plates into different vertical points on the target 154. That is, as one or more deflection plates 156 are driven negative relative to the target 154 the beam is bent from its normal path into registration with a corresponding point on the target, such manner of deflection by the third deflection plate 156 being schematically illustrated in Figure 11.

The scanning arrangement for driving the deflection plates negative to effect deflection of the beam into registration with each successive point on the target basically comprises a double pulse generator 24 (shown in Figure 4), a delay line 30, and a series of diode rectifiers 162*a*—162L, each rectifier having a cathode 164 connected to preassigned taps 32 on the delay line 30, and an anode 166 connected to a preassigned one of the deflection plates 156. A resistor 168*a* is connected between a 10 kv. source and the plate 166*a* of each diode. Capacitance can be added to the circuit arrangement by connecting capacitor units, such as 174, between the anodes 166 and ground as shown. Target 154 is also connected to a potential source in the order of 10 kv., to normally provide a field-free region between the deflection plates 156*a*—156L and the target 154 for the beam 160.

A coupling circuit including a capacitor 170 is connected between the output circuit of pulse generator 24 and delay line 30, and a potential in the order of 20 kv. is connected over resistor 172 to the input circuit for the delay line 30.

In operation, the double pulse generator 24 is controlled by signals received over input circuit 28 in the manner of the previous disclosure to couple trains consisting of two negative 10 kv. pulses each, and spaced at given time intervals, to the delay line 30. A coincident pulse in the order of 20 kv. is thus established on the delay line at a point which is consistent with the time interval between the impulses of the trains (which is in turn determined by the value of the signal coupled to the input side of the pulse generator 24).

With the occurrence of a coincident pulse at a point on the line, the —20 kv. coincident pulse is sufficient to overcome the 20 kv. bias on the cathode or cathodes of the diode 162 connected to such point on the delay line 30. As the selected diode 162 conducts, the voltage on the deflection plate 156 connected thereto is driven negative relative to target 154, and the beam is deflected into registration wtih the target 154 thereby. The details of operation of the display tube 150 responsive to charges of voltages on the deflection plates 156*a* has been described in detail in U.S. Patent No. 2,795,731, which issued to W. R. Aiken on June 11, 1957, and reference is made to the patent for such teaching.

The double pulse generators, such as 24, 124, etc., set forth hereinbefore, were described and illustrated in Figure 4*a* as so-called "free-running" generators which generated repeated trains of two impulses each, the time interval between the impulses of a train being determined by the value of the signal input thereto. In certain embodiments, it may be desirable to effect the transmission of one impulse train for each signal received over the input circuit 28 for the double pulse generator 24. A modified input circuit 180 for the generator 24 is shown in Figure 12, and as there illustrated comprises a coupling capacitor 181 and diode 184 having a cathode 186 and anode 188, the anode 188 being connected to the B+ source 29 over anode resistor 190 and the cathode being connected over resistor 182 to such source. The first stage tube 46 includes anode 48, grid 50, and cathode 52; and the second stage tube 54 includes anode 56, grid 58 and cathode 60. Capacitor 74 couples the anode 56 of the second stage tube to the grid 52 of the first stage tube 46 as in the previous embodiment, and resistance 67 and capacitor 68 couples the anode 48 of the first stage tube 46 to the grid 58 of the second stage tube 54. Resistor 70 connects the coupling circuit to negative bias potential. The plate circuits 48 and 56 are connected over resistors 66 and 101, respectively, to the B+ source, and the grid 50 of the first stage tube 48 is connected over resistor 190 to the positive potential source 29.

With the application of each impulse to the input circuit a train of two impulses is transmitted over the output circuits.

In that the circuit is a basic plate-to-grid coupled monostable, multivibrator known in the art (Waveforms, book 19, Radiation Laboratory Series, page 169) only a brief description is set forth hereat.

Initially, the circuit is in the stable condition with the first stage tube 48 conductive by reason of the positive bias applied over resistance 190 to grid 50 thereof, and the second stage tube 56 is non-conductive by reason of the negative voltage in the plate circuit of tube 48 which is applied over coupling network 67, 68 to the grid 58 of the second stage tube.

With the application of an input signal over input circuit 180 and coupling capacitor 181 to cathode 186 of diode 184, the diode 184 conducts, and at its plate 188 transmits a negative trigger signal which is coupled by capacitor 74 to the grid 50 of the first stage amplifier tube 48 to bias same to cutoff. The voltage in the plate circuit of the first stage tube 48 rises rapidly, and the increase in potential is coupled to differentiating circuit 88 and over capacitor 68 to the grid 58 of the second stage tube 54 which is rendered conductive thereby.

As the second stage tube 56 conducts, the negative going voltage which appears in the plate thereof is coupled to differentiating circuit 78, and also over capacitor 74 to the grid 50 of the first stage tube 48 to further bias the tube toward cutoff. Such action continues until the first stage tube 48 has been rendered non-conductive, and the second stage tube 54 has been rendered fully conductive.

As the second stage tube 54 becomes fully conductive, the change in voltage which appeared in the plate circuit thereof is terminated. Capacitor 74 leaks away over resistor 190, and as the voltage on the grid 50 of the first stage tube 48 rises exponentially, tube 48 is once more biased to conduct, and the circuit flops in a regenerative manner back to its initial state where it remains until the receipt of another signal over input circuit 180. The pulse output to differentiating circuits 78, 88 is similar to that effected in the embodiment of Figure 4.

Further, as in such embodiment the time interval between the two impulses generated by the multivibrator in each operation thereof is varied by providing different input signals over the modulating circuit comprised of resistor 64 and input circuit 28 to thereby vary the charging rate of capacitor 74.

Figure 14:
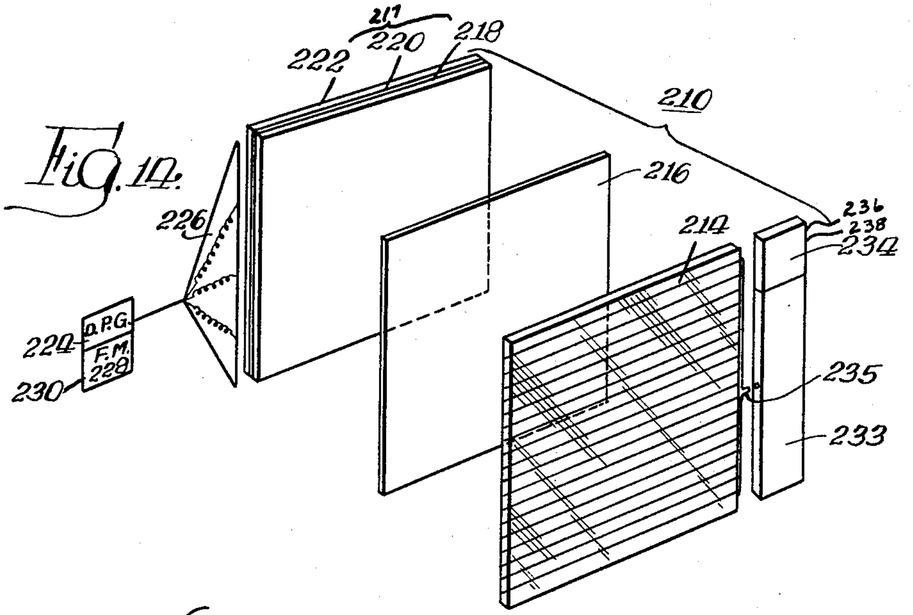
Figure 14 is a schematic view of a display device energized by two novel circuit selecting devices.

With reference to Figure 14, there is shown thereat an embodiment of a horizontal or coordinate type display device wherein the novel concepts disclosed herein relative to accomplishing point selection on a target are utilized in combination with the novel point selecting concepts of the above identified copending applications.

More specifically as there shown display device 210 includes an array of horizontal parallel-spaced electrical conductors 214 disposed between a first panel 212 and one face of a layer of electroluminescent phosphor material 216. A rear panel 217 basically comprises a transmisison line which may consist of a plate 218 of electrically conductive material, such as for instance copper, a layer of dielectric material 220 such as barium titanite or other known materials, and a second electrically conductive layer 222.

One end of each of the horizontally disposed conductors 214 extended outwardly with at least one marginal edge of the device to provide terminals for connection thereof to each of the successive taps 235 of a delay line 233 which is associated therewith. As in the previous embodiments, the number of conductor members is determined by the nature of the resolution desired in the presentation. A double pulse generator 234, similar to the unit disclosed in Figure 4, is provided for the purpose of energizing delay line 233 in accordance with the value of the signals input thereto, the delay line 233 in turn selectively energizing the indicated one of the horizontal conductors 214.

The phosphor layer 216, as heretofore described may comprise any of the well known electroluminescent phosphor materials conventionally used in such application.

The section 217 which is disposed adjacent the second phosphor face is energized by a radiator unit 226 which is disposed adjacent one of the vertical edges of the section 217, and is in turn connected for energization by a set of control circuits including an input circuit 230, a frequency modulator 228, and a double pulse generator 224 connected in the manner of the structure taught in more detail in the previous disclosures, and particularly the copending application having Serial No. 574,192.

Briefly, as there taught, information representative signals are applied over input circuit 230 to indicate the point along the horizontal axis of the device which is to be energized. Frequency modulator unit 228 is operative in response to the input signals to in turn adjust the double pulse generator 224 in its pulse generating function, the generator being operative in the manner of the unit of Figure 4 herein to provide successive impulse trains. Each of the impulse trains is comprised of a pair of electromagnetic impulses, the two impulses of each train being spaced by a predetermined time interval which is determined by the value of the signal applied to the pulse generator 224 by frequency modulator unit 228. The two pulses of each train are coupled to the transmission line 218 to establish a standing wave at the point at which the second pulse in each train meets the first reflected pulse of such train, and establishes thereat a difference of potential between the two conductors along a vertical row of points. That is, as a standing wave is established along the transmission line comprised of the two plates 218, 222, a potential difference is exhibited between such plates which extends along a vertical line which is located at the nadir of the wave. It is apparent that by varying the frequency of the double impulse generator output, the standing wave will be moved along the length of the transmission line, and a voltage difference will be established at correspondingly successive points therealong.

It is apparent that a point is selectively energized on the phosphor 216 by effecting the selection of a vertical line of points in this manner and specifically by establishing a potential difference across section 217 along a vertical line of points, and simultaneously effecting selective energization of delay line 233 and an indicated one of the horizontal conductors 214 in the manner heretofore described. The potential difference between the energized one of the horizontal conductors 214 and the vertical potential line established by the standing wave is of a value to excite the phosphor at the relative crossover points thereto to be excited. Variations of the value of the signals which are coupled to input circuits 230 and 238 will vary the crossover points thus excited in an obvious manner. The various novel concepts set forth in the copending applications may, of course, be incorporated into the embodiment of Figure 14 to provide a more detailed and specific teaching of the invention.

Figure 15:
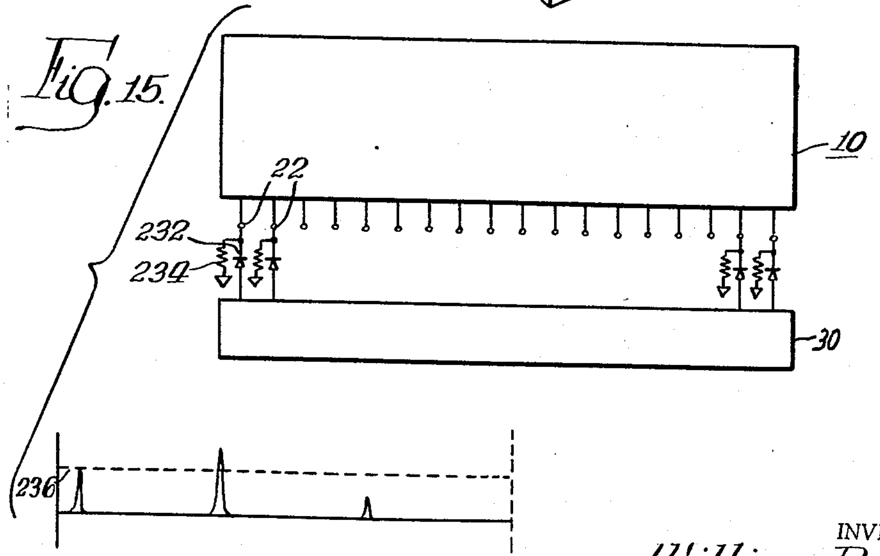
Figure 15 is an illustration of the novel unit as utilized with bias devices.

As noted heretofore in certain applications it may be desirable to utilize the peak or top portion of a coincident impulse for energization purposes whereby successive impulses may be applied at closer intervals and the frequency of the applied impulses may be increased to obtain greater phosphor excitation. As shown in Figure 15, which includes a schematic showing of the display device 10 and delay line 30 of Figures 1–3, a rectifier element, such as illustrated unit 232, is connected between each tap on the delay line 30 and its corresponding terminal 22 on the display device 10. A positively biased resistor element 234 may be connected between the rectifier 232 and the tap 22 to which the rectifier is connected. As shown by dotted lines 236, the rectifier elements 232 are selected to establish a fixed bias which is of a value to prevent energization of the interconnected tap 22 by the single pulses applied to the delay line 30, and additionally to permit excitation of the phosphor only by the peak portion of a coincident pulse. Other similar methods of biasing known in the art can be utilized to effect a more selective energization of the conductor members.

While what is described is regarded to be a preferred embodiment of the invention, it will be apparent that variations, rearrangements, modifications and changes may be made therein without departing from the scope of the present invention as defined by the appended claims.

I claim:

1. An electronic selector device comprising a transmission line, at least one circuit connected to a predetermined point on said line, and impulse transmitting means operative to selectively energize said circuit including means for transmitting at least a first and second impulse over said line in timed relation to effect coincidence of the two impulses at the point on the line to which the said circuit is connected to provide a coincident pulse of an increased amplitude at said point of a value to selectively energize the circuit connected thereat.

2. An electronic selector device comprising a transmission line, a plurality of separate circuits, each of which is connected to a different point on said line, and impulse transmitting means operative to selectively energize different ones of said circuits including means for transmitting at least a first and second impulse over said line to effect coincidence of the two impulses at the point on the line to which the desired one of the circuits is connected and thereby the selective energization of said one circuit.

3. An electronic selector device comprising a transmission line, a plurality of circuits, each of which is connected to a different point on said line, and impulse transmitting means operative to selectively energize different ones of said circuits including means for transmitting at least a first and second impulse over said line, timing means for establishing a time interval between said impulses which is of a value to effect coincidence of the two impulses at the point on the line to which the desired circuit is connected to provide a coincident pulse of an increased amplitude at said point of a value to selectively energize the circuit connected to said point, and control means for adjusting the time interval between coupling of said impulses to said line to different values to thereby effect selection of a correspondingly different one of said circuits.

4. An electronic selector device comprising a transmission line, a plurality of separate circuits, each of which is connected to a different point on said line, and impulse transmitting means operative to transmit at least a first and second impulse over said line, each of said first and second impulses being inoperative alone to energize said circuits, and timing means for establishing a time interval for the coupling of the first and second impulses to said line which is of a value to establish coincidence of the two impulses at the point on the line to which the desired circuit is connected to provide a coincident pulse of increased amplitude sufficient to energize the circuit connected to the point of occurrence of the coincident pulse.

5. An electronic selector device comprising a transmission line, a plurality of circuits connected to said line, and impulse transmitting means operative to selectively energize different ones of said circuits including means for transmitting a first impulse for reflection back along said line, and thereafter transmitting a second impulse over said line to effect coincidence thereof with the reflected first impulse at the point on the line to which the desired circuit is connected to provide a coincident pulse of increased amplitude at said point and the energization of the desired circuit connected to said point by the coincident pulse.

6. An electronic selector device comprising a transmission line, a plurality of circuits, each of which is connected to a different point along said line, and impulse transmitting means operative to selectively energize different ones of said circuits including means for coupling a first impulse to one end of said line, and means operative to couple a second impulse to the second end of said line in timed relation to the first impulse to effect coincidence of the two impulses at the point on the line to which the desired circuit is connected and a coincident pulse at said point of an increased amplitude sufficient to energize the circuit connected to said point.

7. An electronic selector device comprising a transmission line, a plurality of circuits, each of which is connected to said line at a different point, and impulse transmitting means operative to selectively energize different ones of said circuits including means for transmitting a first and second impulse over said line at different time intervals to effect coincidence of the two impulses at the point on the line to which the desired circuit is connected to provide a coincident pulse of increased amplitude thereat for energizing the desired circuit, and signal modulating means for varying the amplitude of said signals to thereby vary the value of the resultant coincident impulse applied to the selected circuit.

8. An electronic selector device comprising a transmission line, a plurality of circuits each of which is connected to said line at a different point, and impulse transmitting means operative to selectively energize different ones of said circuits, including means for transmitting a first and second impulse over said line at different time intervals to effect coincidence of the two pulses at the point on the line to which the desired circuit is connected to provide a coincident pulse of an increased amplitude thereat, signal responsive means connected in each of said circuits, and biasing means connected in each circuit to control energization of said signal responsive means therein only in response to the occurrence of a coincident pulse signal of said increased amplitude on said line at its connection point thereto which impulse is of a value which is in excess of a predetermined value established by said biasing means.

9. An electronic selector device comprising a pulse delay line, a plurality of circuits, each of which is connected to different points on said line, and impulse transmitting means operative to selectively energize different ones of said circuits including a one-shot multivibrator means operative in response to receipt of an input signal to generate an impulse set comprised of at least a first and a second impulse and pulse derivative means for effecting the transmission of two pulses derived from said first and second impulses over said line at relative different times to effect coincidence of the two pulses at the point on the line to which a predetermined one of said circuits is connected to provide a pulse of increased amplitude thereat, and the energization of said one circuit.

10. An electronic selector device comprising a transmission line, a plurality of circuits each of which is connected to different points on said line, and impulse transmitting means operative to selectively energize different ones of said circuits including a free-running multivibrator circuit operative to repeatedly generate sets of impulse trains, each train comprising a first and second impulse, pulse derivative means for effecting the transmission over said line of two pulses derived from said first and second impulses, the derived impulses being transmitted at predetermined spaced intervals to effect coincidence of the two pulses at a predetermined point on the line and a pulse of increased amplitude thereat to energize the circuit connected to said point, and control means operative in response to the receipt of modulating signals of different values to correspondingly alter the time interval between the impulses of each train.

11. An electronic display device including an electric field responsive medium, at least a first and a second conductor disposed in at least partially coextensive and spaced relation with each other, at least a portion of said electric field responsive medium being disposed therebetween; a transmission line, at least one circuit connected to a preselected point on said line and to said first conductor, impulse transmitting means operative to selectively energize said first conductor including means for transmitting a first and a second impulse over said line to effect coincidence of the two pulses at the point on the line to which said first conductor is connected, and means for coupling an energizing potential to said second conductor of a value with said coincident pulse to effect energization of the electric field medium disposed between the coextensive portions of said first conductor and said second conductor.

12. An electronic display device including an electric field responsive medium, a first conductor and a second conductor set, at least one of the conductor members in the second set being disposed in spaced and at least partially coextensive relation with at least one member of said first conductor set, a portion of said electric field responsive medium being disposed therebetween; a transmission line, a tap for connecting said one conductor of said first set to a preselected point on said line, impulse transmitting means operative to selectively transmit a first and a second impulse over said line to effect coincidence of the two pulses at the point on the line to which said conductor of said first set is connected to provide a coincident pulse of increased amplitude, and signal source means for coupling an energizing potential to said second conductor member which is of a value with said coincident pulse to effect energization of the electric field responsive medium disposed between the coextensive portions of said first conductor and said second conductor.

13. A display device as set forth in claim 12 which includes tap means for connecting each conductor of said first conductor set to a different point on said line, and which includes means in said impulse transmitting means operative in response to the receipt of different signals to correspondingly alter the time interval between the first and second impulses, and thereby the point on the line and conductor of the first set which is energized thereby.

14. A display device as set forth in claim 12 which includes a biassing member connected between each tap on said line and its interconnected conductor.

15. An electronic display device as set forth in claim 12 in which said signal source means includes a second transmission line, means for connecting the different conductors of said second set to different points thereon, and impulse transmitting means operative to selectively transmit a first and a second impulse over said second line to selectively effect coincidence of the two impulses at the different points on the line to energize the one of the conductors connected thereat.

16. An electronic display device as set forth in claim 12 in which said signal source means comprises a second transmission line, impulse means for transmitting a first and a second impulse over said line to selectively establish a standing wave and a potential difference at different rows of points on said second line, the value of the potential difference between said row of points on said second conductor and an energized one of said first conductors effecting excitation of the medium between the coextensive portions thereof.

17. An electronic display device including an electric field responsive medium, a first array of vertically disposed conductor members and a second conductor set including at least one conductor member which extends longitudinally across a plurality of said vertically disposed members, a portion of said electric field responsive medium being disposed therebetween; a transmission line, means for connecting said conductors of said first array to different preselected points on said line, impulse transmitting means operative to selectively transmit a first and a second impulse over said line in different timed relation to effect coincidence of the two impulses and the occurrence of a coincident pulse of increased amplitude at correspondingly different points on the line and energization of the vertical conductors connected to said points, and signal source means for coupling an energizing potential to said one conductor member of said second set which is of a value with said coincident pulse as applied to a vertical conductor to effect energization of the electric field responsive medium disposed between the coextensive portions thereof.

18. An electronic display device including an electric field responsive medium, a first array of grid conductor members and a second array of grid conductor members, the conductor members in the second array being disposed in spaced and perpendicular relation with the members of said first conductor array, and with said electric field responsive medium being disposed therebetween; a transmission line, means for connecting the different conductors of said first array to different preselected points on said line, impulse transmitting means operative to selectively transmit a first and a second impulse over said line to effect coincidence of the two pulses at different points on the line to energize the conductor connected to the line at the different points, and signal source means for coupling an energizing potential to the different conductor members of said second conductor array which is of a value with said coincident pulse as applied to a member of said first array to effect energization of the electric field responsive medium disposed between the coextensive portions of the energized conductors of said first and second arrays.

19. An electronic display device as set forth in claim 12 in which said signal source means includes means for coupling a potential to the second conductor which is of an opposite polarity to the resultant coincident impulse applied to the first conductor.

20. The method of selectively energizing one conductor of a plurality of conductors connected to a transmission line which comprises the steps of applying a first impulse to the line and thereafter applying a second impulse to said line timed to coincide with the first impulse at the point of connection of the desired conductor to said line to provide a coincident pulse of increased amplitude at said point for energizing said conductor.

References Cited in the file of this patent

UNITED STATES PATENTS

| | | |
|---|---|---|
| 2,471,253 | Toulon | May 24, 1949 |
| 2,543,793 | Marks | Mar. 6, 1951 |
| 2,558,019 | Toulon | June 26, 1951 |
| 2,670,402 | Marks | Feb. 23, 1954 |
| 2,774,813 | Livingston | Dec. 18, 1956 |
| 2,818,531 | Peek | Dec. 31, 1957 |